(12) United States Patent
Eijkelkamp

(10) Patent No.: US 12,227,914 B2
(45) Date of Patent: Feb. 18, 2025

(54) METHOD FOR PROVIDING AN UNDERGROUND BARRIER FOR A WATER RESERVOIR

(71) Applicant: Royal Eijkelkamp B.V., Giesbeek (NL)

(72) Inventor: Hugo Jaap Eijkelkamp, Giesbeek (NL)

(73) Assignee: Royal Eijkelkamp B.V., Giesbeek (NL)

( * ) Notice: Subject to any disclaimer, the term of this patent is extended or adjusted under 35 U.S.C. 154(b) by 57 days.

(21) Appl. No.: 17/924,419

(22) PCT Filed: May 11, 2020

(86) PCT No.: PCT/EP2020/062982
§ 371 (c)(1),
(2) Date: Nov. 10, 2022

(87) PCT Pub. No.: WO2021/228351
PCT Pub. Date: Nov. 18, 2021

(65) Prior Publication Data
US 2023/0250604 A1    Aug. 10, 2023

(51) Int. Cl.
*E02D 19/16* (2006.01)
*E02D 3/12* (2006.01)

(52) U.S. Cl.
CPC .............. *E02D 3/12* (2013.01); *E02D 19/16* (2013.01); *E02D 2250/003* (2013.01); *E02D 2300/0018* (2013.01)

(58) Field of Classification Search
CPC ...... E02D 3/12; E02D 19/16; E02D 2250/003
See application file for complete search history.

(56) References Cited

U.S. PATENT DOCUMENTS

| | | | |
|---|---|---|---|
| 3,300,984 A | | 1/1967 | Armentrout |
| 4,399,866 A | * | 8/1983 | Dearth ................. E21B 43/247 166/259 |
| 4,426,175 A | * | 1/1984 | Lin .......................... E02D 3/12 405/269 |
| 4,514,112 A | * | 4/1985 | Sano ........................ E02D 3/12 405/269 |
| 4,545,702 A | * | 10/1985 | Sano ..................... E21B 49/006 405/269 |

(Continued)

FOREIGN PATENT DOCUMENTS

| | | |
|---|---|---|
| JP | S58156618 A | 9/1983 |
| WO | 2008033536 A2 | 3/2008 |

*Primary Examiner* — Benjamin F Fiorello
(74) *Attorney, Agent, or Firm* — The Webb Law Firm

(57) ABSTRACT

The invention relates to a method for providing an underground barrier for a water flow. The method includes the steps of drilling in soil a number of parallel vertical holes; inserting pipe strings into the drilled holes, where each pipe string has a pipe string wall with a plurality of openings arranged distributed along the length of the pipe string; introducing injector means in each of the pipe strings; positioning the injector means at a plurality of discrete depths in the respective pipe string and aligned at each depth with at least one of the openings in the pipe string wall; and injecting at each discrete depth a sealing compound, such as sodium silicate, through the at least one aligned opening into the soil.

8 Claims, 5 Drawing Sheets

(56) References Cited

U.S. PATENT DOCUMENTS

| | | | |
|---|---|---|---|
| 4,651,824 A * | 3/1987 | Gradle | E02D 31/00 |
| | | | 405/270 |
| 4,697,953 A | 10/1987 | Nussbaumer et al. | |
| 5,027,908 A * | 7/1991 | Roussy | E21B 7/24 |
| | | | 384/91 |
| 5,032,042 A * | 7/1991 | Schuring | E21B 43/2607 |
| | | | 166/308.1 |
| 6,840,710 B2 * | 1/2005 | Peters | E03B 3/36 |
| | | | 405/270 |
| 7,972,080 B2 * | 7/2011 | Summers | B65G 5/00 |
| | | | 405/53 |
| 9,988,784 B2 * | 6/2018 | Barron | E02D 5/34 |
| 10,065,223 B2 * | 9/2018 | Klock | B09C 1/08 |
| 2004/0071512 A1 * | 4/2004 | Muhlbaier | E02D 19/16 |
| | | | 166/308.1 |
| 2006/0263150 A1 * | 11/2006 | Barrett | E02D 3/12 |
| | | | 405/259.5 |
| 2008/0072968 A1 * | 3/2008 | Peters | E02B 3/00 |
| | | | 137/391 |
| 2009/0155002 A1 * | 6/2009 | Hakkinen | E02D 27/34 |
| | | | 405/263 |
| 2009/0304457 A1 * | 12/2009 | Shimada | E02D 3/12 |
| | | | 405/269 |
| 2017/0051585 A1 * | 2/2017 | Hazel | E21B 33/127 |
| 2020/0248524 A1 * | 8/2020 | Corre | E21B 49/008 |
| 2022/0025603 A1 * | 1/2022 | Da Costa | E02D 3/12 |

* cited by examiner

METHOD FOR PROVIDING AN UNDERGROUND BARRIER FOR A WATER RESERVOIR

CROSS-REFERENCE TO RELATED APPLICATION

This application is the United States national phase of International Application No. PCT/EP2020/062982 filed May 11, 2020, the disclosure of which is hereby incorporated by reference in its entirety.

BACKGROUND OF THE INVENTION

Field of the Invention

The invention relates to a method for providing an underground barrier for a water flow.

Description of Related Art

In, for example, some area's where there is only sporadic, but massive rainfall, the geological formation of the soil is not adequate to keep the rain for a longer time, such that vegetation and people can bridge the period to a next rainfall by storing the rainwater.

Typically, such area's have a porous geological layer which drains the water to sea, such that the soil above the porous geological layer becomes dry quickly and does not allow for a buffer of water for the soil. It is even possible that sea water penetrates the porous layer and makes the soil silt, which is even worse for the vegetation.

It is known to provide an underground barrier or dam by digging a trench over a substantial length and depth and by filling the trench with concrete. A disadvantage is that buildings and houses at the surface of the geological formation need to be removed in order to dig the trench and fill the trench with concrete.

A further disadvantage is that the movement of geological layers can cause cracks in the concrete underground barrier, which will lead to leakages. It is almost impossible to repair such leakages.

It is furthermore known from U.S. Pat. No. 4,697,953 to provide a watertight layer underneath a garbage dump by digging vertical shafts and by drilling from these vertical shafts at a desired depth a number of horizontal holes. From these holes a sealing compound, such as sodium silicate, is injected into the ground to provide a horizontal watertight barrier layer.

Drilling of the horizontal holes, requires drilling equipment to be lowered down the shafts. Such drilling equipment needs to be designed specifically for such a task.

If such a technique would be used for providing a vertical barrier layer, than still two vertical shafts need to be dug, from which horizontal holes at different depths need to be drilled. Also in such a case specialized equipment is required for drilling the horizontal holes.

SUMMARY OF THE INVENTION

It is an object of the invention to reduce these disadvantages.

This object is achieved with the method according to the invention, which method comprises the steps of:
drilling in soil a number of parallel vertical holes;
inserting pipe strings into the drilled holes, wherein each pipe string has a pipe string wall with a plurality of openings arranged distributed along the length of the pipe string;
introducing an injector in each of the pipe strings;
positioning the injector at a plurality of discrete depths in the respective pipe string and aligned at each depth with at least one of the openings in the pipe string wall;
injecting at each discrete depth a sealing compound, such as sodium silicate, through the at least one aligned opening into the soil.

With the invention known drilling equipment can be used for drilling the vertical holes and for inserting the pipe strings in the drilled holes.

By positioning the injector at discrete depths in each of the pipe strings and by injecting a sealing compound via the openings in the pipe string walls, a matrix of underground clouds of sealing compound is obtained. By ensuring that the spacing between the clouds is small enough, a watertight, underground barrier is obtained.

In case a crack occurs in the underground barrier, then the injector can be positioned again in the pipe strings or if the pipe strings are no longer accessible, new holes can easily be drilled and new pipe strings can be used to inject sealing compound which will seal the cracks in the underground barrier.

A preferred embodiment of the method according to the invention further comprises the steps of:
before injecting the sealing compound blocking the pipe string passage above and below the at least one aligned opening;
pumping the sealing compound in the space between the blockages and the pipe string wall, such that sealing compound is pumped through the at least one aligned opening and is injected into the soil.

By blocking the pipe string passage above and below the openings through which the sealing compound is to be injected into the soil, a space is created in which the sealing compound can be pumped into the soil and the sealing compound will on its own flow through the desired openings in the pipe string wall. This removes the need of aligning a nozzle in front of the desired opening, which can be quite cumbersome, especially when the pipe string is twisted. Furthermore, there is no need to know the rotational position of the injecting means. Only the depth needs to be known and the error in the obtained depth can be quite large, as the blockages of the passage of the pipe string may be positioned somewhere between subsequent openings in the pipe string wall.

In a further preferred embodiment of the method according to the invention the plurality of openings in the pipe string wall are provided with unidirectional passages, which prevent inflow into the pipe string.

Preferably, the unidirectional passages are provided by flexible sleeves arranged around the pipe string wall.

By providing unidirectional passages in the openings, it is ensured that no back flow of the sealing compound into the pipe string occurs when the injector is positioned to a next level in the pipe string. Without such unidirectional passages part of the sealing compound may flow back, such that no sufficient large cloud of sealing compound is obtained in the matrix of clouds to provide a watertight underground barrier.

In another embodiment of the method according to the invention the sealing compound is injected into the soil in substantial radial direction.

By injecting the sealing compound in substantial radial direction an easily predictable penetration of the sealing compound is obtained.

When during drilling of the vertical holes, the density of the geological formation is recorded, one can control the amount of sealing compound to be injected through a specific opening in the pipe string wall based on these recorded densities.

In a further embodiment of the method according to the invention the pitch in longitudinal direction of the pipe string between the plurality of openings is between 25 cm and 150 cm, preferably 80 cm.

In yet another preferred embodiment of the method according to the invention the number of parallel vertical holes are drilled using a sonic drilling method. A sonic drilling method allows for drilling of holes, without any contamination of the ground by drilling fluids, and allows for high accuracy of the drilling direction, such that subsequent vertical holes are substantially parallel over the full depth of the drilled holes.

The inventions further relates to an underground reservoir comprising:
- a geological formation with at least one porous geological layer along which water flows;
- an underground barrier arranged downstream of the water flow, which underground barrier is provided with the method according to the invention and wherein the underground barrier extends from a depth above the porous geological layer to a depth below the porous geological layer.

BRIEF DESCRIPTION OF THE DRAWINGS

These and other features of the invention will be elucidated in conjunction with the accompanying drawings.

DESCRIPTION OF THE INVENTION

Figure 1A:
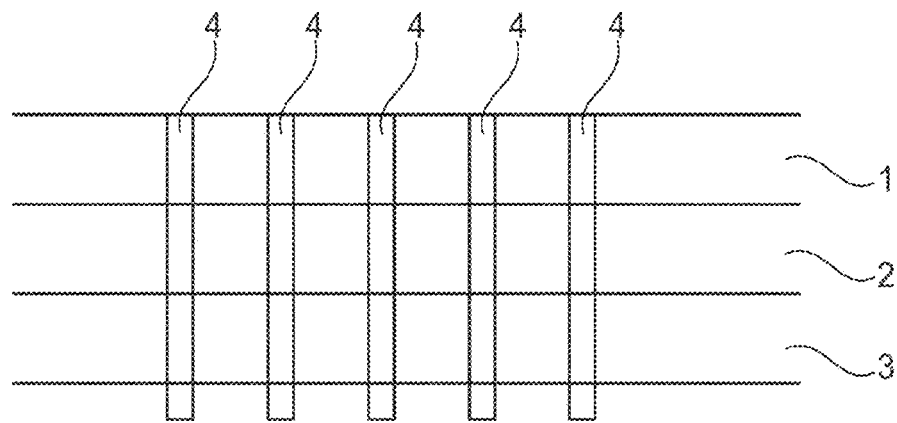
FIGS. 1A-1C show the different steps of an embodiment of the invention.
Figure 1B:
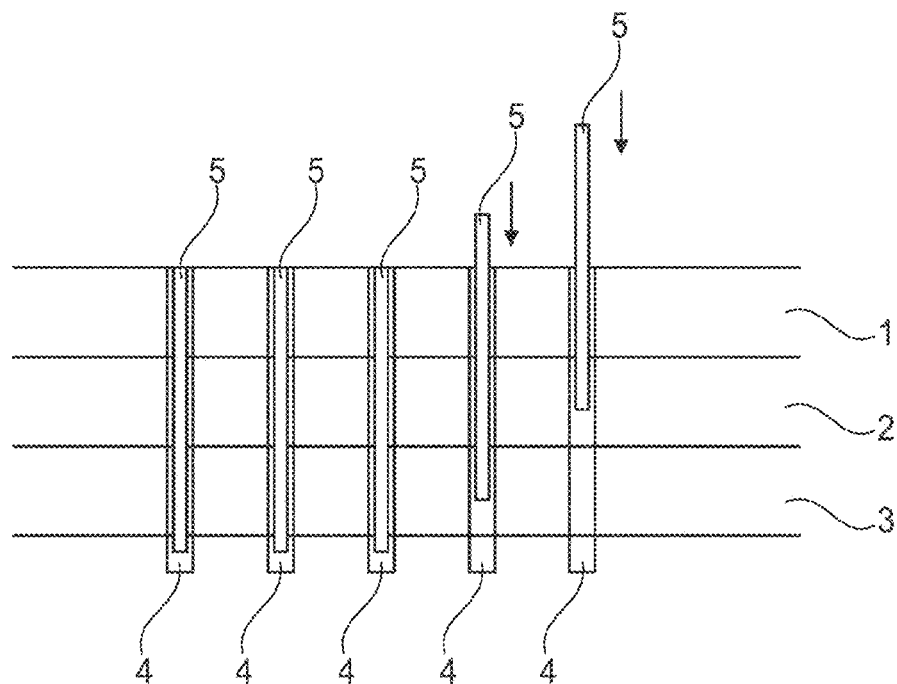

FIG. 1A shows soil with a number geological layers 1, 2, 3. According to an embodiment of the method according to the invention vertical holes 4 are drilled into the soil 1, 2, 3. As shown in FIG. 1B pipe strings 5 are then inserted into the vertical holes 4. Then the injectors are let down into each pipe string 5 and positioned at discrete heights to inject clouds of sealing compound 6 into the geological layers 1, 2, 3 to provide a watertight underground barrier.

Figure 2:
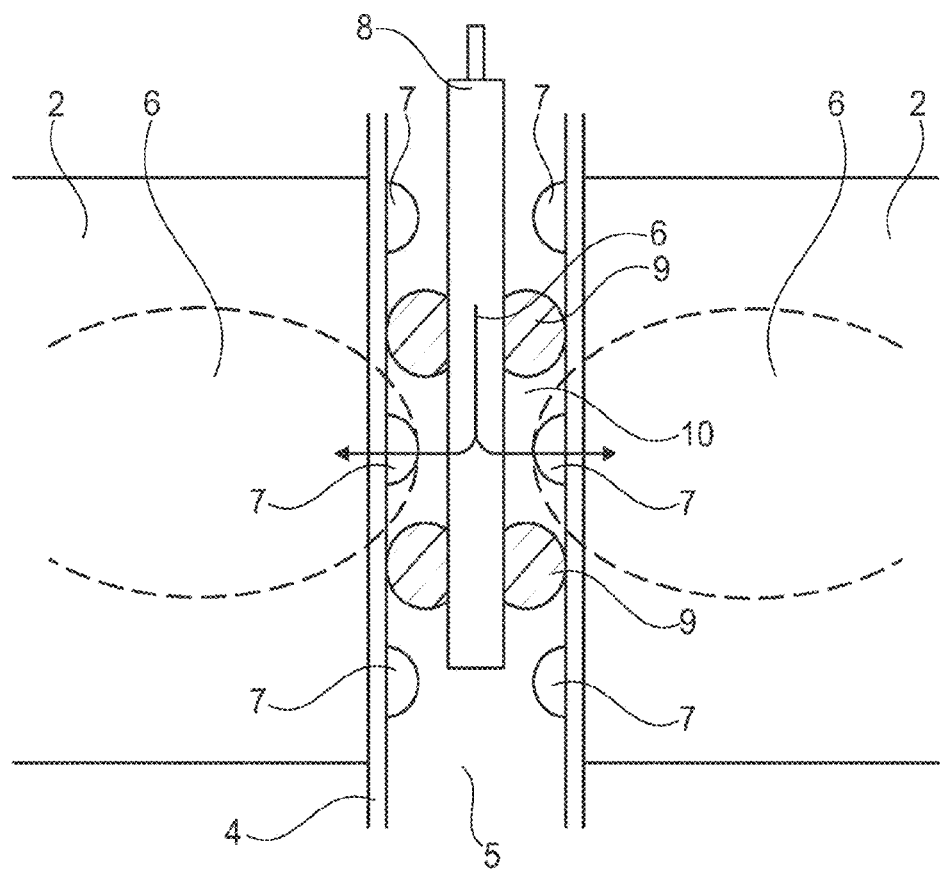
FIG. 2 shows a detail of the injection means.

FIG. 2 shows a detailed view of the step of injecting sealing compound 6 into the geological layers 1, 2, 3. The pipe string 5 is provided with a plurality of openings 7.

Injector 8 is let down through the pipe string 5 to a discrete height. Then the passage of the pipe string 5 is blocked by inflatable or expandable blocking means 9, which are called packer in the field, above and below an opening 7 in the pipe string wall.

The blocking means 9 and the pipe string wall define a space 10 in which sealing compound 6 is pumped, which is then injected through the openings 7 into the geological layers 1, 2, 3.

Figure 4:
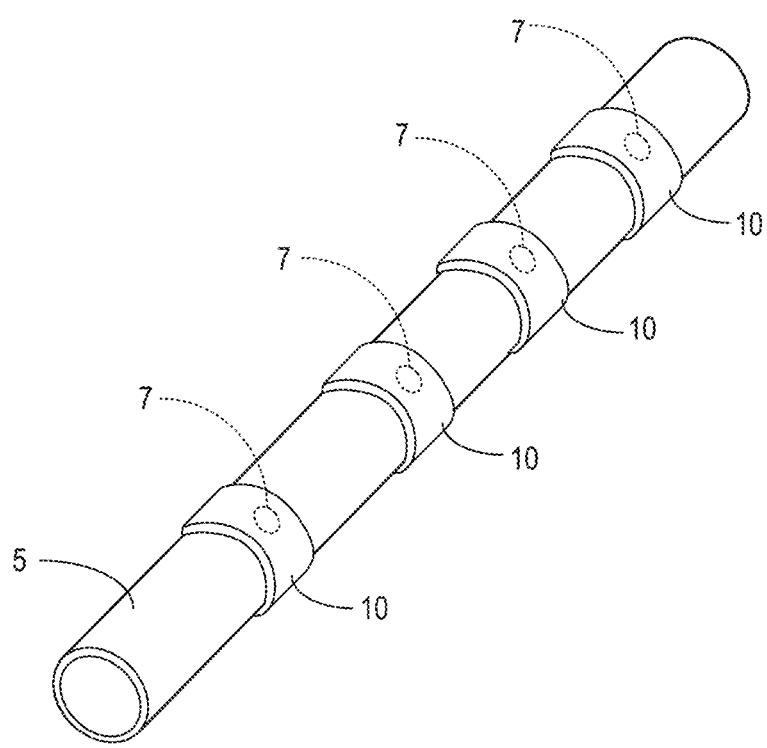
FIG. 4 shows a pipe string with openings covered by flexible sleeves.
Figure 5:
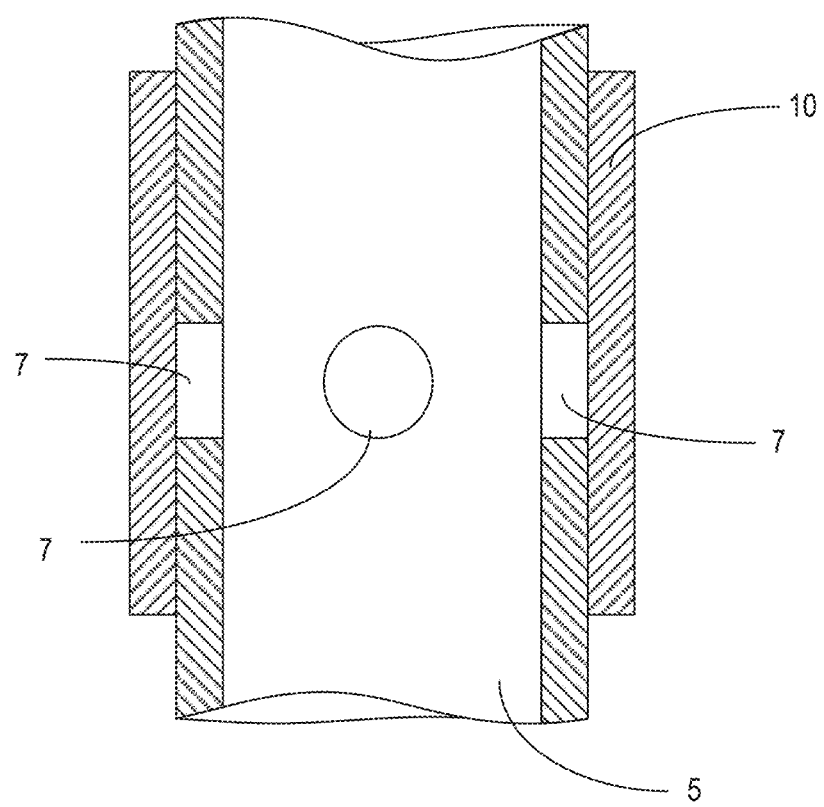
FIG. 5 is a cross section of the pipe string in FIG. 4.

FIGS. 4 and 5 show the pipe string 5. The plurality of openings 7 in the pipe string 5 are provided with unidirectional passages, which prevent inflow into the pipe string 5. The unidirectional passages are provided by flexible sleeves 10 arranged around the pipe string 5 wall. When sealant is injected, the pressure will push the flexible sleeve 10 away from the wall of the pipe string 5, such that the sealant can flow from inside of the pipe string 5 through the openings 6 to the outside.

Figure 1C:
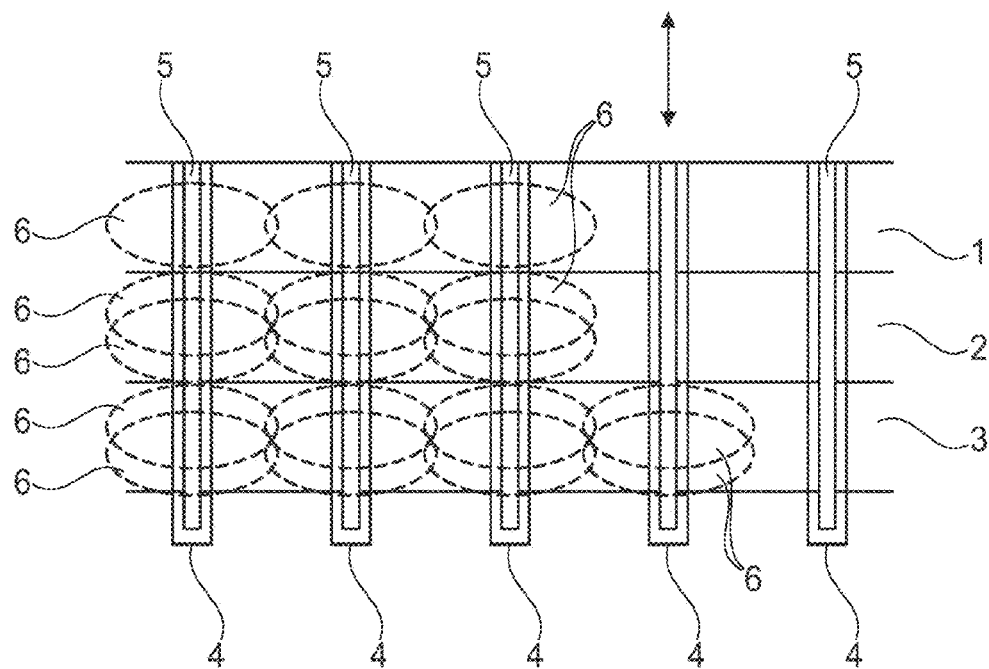
Figure 3:
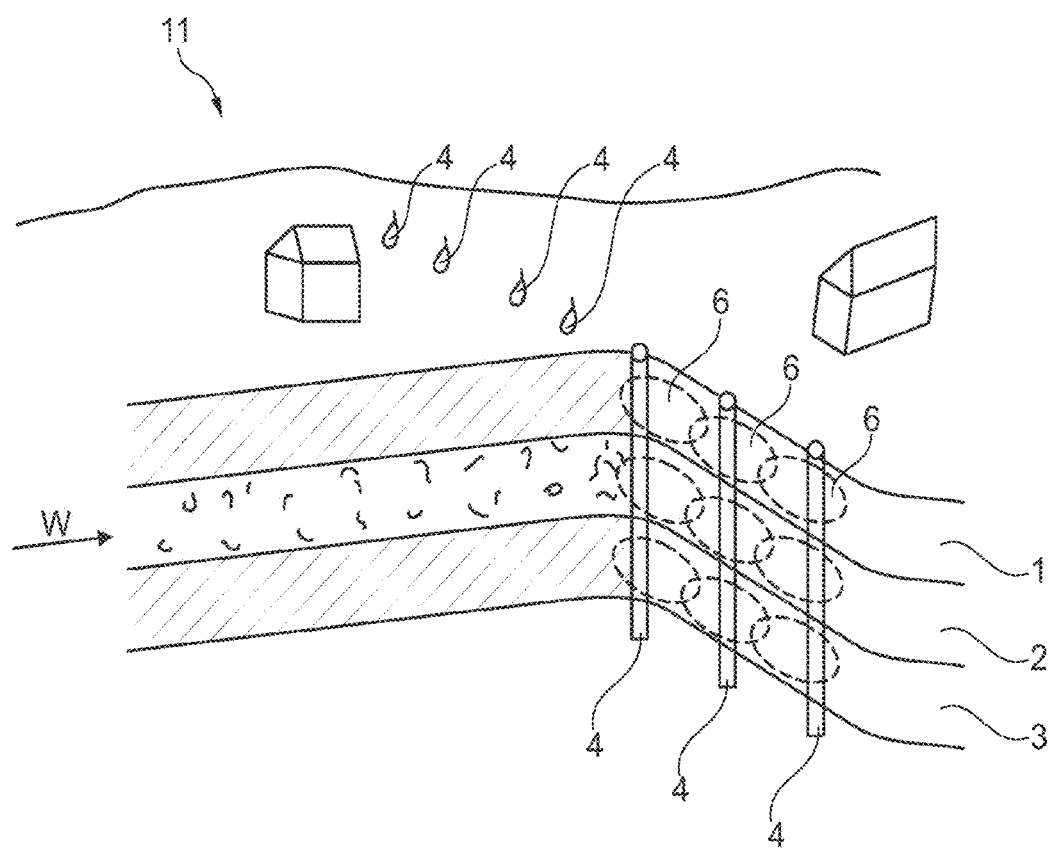
FIG. 3 shows an embodiment of an underground reservoir according to the invention.

FIG. 3 shows a geological formation 11 with a number of geological layers 1, 2, 3. A number of vertical holes 4 is drilled into the soil, as explained above with reference to FIGS. 1A-1C and a sealing compound, such as sodium silicate, is injected into the geological layers 1, 2, 3 to provide an underground barrier.

The geological layer 2 is a porous layer and guides a flow of water W. Due to the underground barrier, this flow of water W is buffered in the underground reservoir formed by the porous geological layer 2 and the underground barrier of sealing compound 6.

The invention claimed is:

1. A method for providing an underground barrier for a water flow, which method comprises the steps of:
   drilling in soil a number of parallel vertical holes;
   inserting pipe strings into the drilled holes, wherein each pipe string has a pipe string wall with a plurality of openings arranged distributed along the length of the pipe string;
   introducing an injector in each of the pipe strings;
   positioning the injector at a plurality of discrete depths in the respective pipe string and aligned at each depth with at least one of the openings in the pipe string wall;
   injecting at each discrete depth a sealing compound through the at least one aligned opening into the soil;
   before injecting the sealing compound blocking the pipe string passage above and below the at least one aligned opening; and
   pumping the sealing compound in the space between the blockages and the pipe string wall, such that sealing compound is pumped through the at least one aligned opening and is injected into the soil;
   wherein the plurality of openings in the pipe string are provided with unidirectional passages, which prevent inflow into the pipe string.

2. The method according to claim 1, wherein the unidirectional passages are provided by flexible sleeves arranged around the pipe string wall.

3. The method according to claim 1, wherein the sealing compound is injected into the soil in substantial radial direction.

4. The method according to claim 1, wherein the pitch in longitudinal direction of the pipe string between the plurality of openings is between 25 cm and 150 cm.

5. The method according to claim 4, wherein the pitch in the longitudinal direction of the pipe string between the plurality of openings is 80 cm.

6. The method according to claim 1, wherein the number of parallel vertical holes are drilled using a sonic drilling method.

7. The method according to claim 1, wherein the sealing compound is sodium silicate.

8. An underground reservoir comprising:
   a geological formation with at least one porous geological layer along which water flows; and
   an underground barrier arranged downstream of the water flow, which underground barrier is provided with the method according to claim 1 and wherein the underground barrier extends from a depth above the porous geological layer to a depth below the porous geological layer.

\* \* \* \* \*